United States Patent
Hyde

(10) Patent No.: US 8,217,776 B2
(45) Date of Patent: Jul. 10, 2012

(54) TIRE PRESSURE SENSOR LOCATION IDENTIFICATION

(75) Inventor: Stephen L. Hyde, Clarkston, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 653 days.

(21) Appl. No.: 12/388,684

(22) Filed: Feb. 19, 2009

(65) Prior Publication Data

US 2010/0207752 A1   Aug. 19, 2010

(51) Int. Cl.
*B60C 23/00* (2006.01)

(52) U.S. Cl. ......... 340/442; 340/438; 340/443; 340/447

(58) Field of Classification Search .................. 340/442
See application file for complete search history.

(56) References Cited

U.S. PATENT DOCUMENTS

| | | | |
|---|---|---|---|
| 6,580,365 B2 | 6/2003 | Starkey | |
| 6,894,600 B2 * | 5/2005 | Phelan | 340/10.34 |
| 6,920,785 B2 | 7/2005 | Toyofuku | |
| 6,935,169 B2 | 8/2005 | Newman et al. | |
| 6,966,227 B2 | 11/2005 | Okubo et al. | |
| 6,967,570 B2 | 11/2005 | Tsuji et al. | |
| 7,015,801 B1 | 3/2006 | Juzswik | |
| 7,015,804 B2 | 3/2006 | Okubo et al. | |
| 7,088,226 B2 | 8/2006 | McClelland et al. | |
| 7,367,227 B2 | 5/2008 | Stewart et al. | |
| 7,423,532 B2 | 9/2008 | Stewart et al. | |
| 7,673,504 B2 * | 3/2010 | Matsuda et al. | 73/146.5 |
| 2002/0073771 A1 | 6/2002 | Katou | |
| 2002/0149477 A1 | 10/2002 | Desai et al. | |
| 2006/0192661 A1 | 8/2006 | Gerardiere | |
| 2006/0238323 A1 * | 10/2006 | Watabe et al. | 340/442 |
| 2007/0030165 A1 | 2/2007 | Teshima et al. | |
| 2007/0200676 A1 | 8/2007 | Costes et al. | |
| 2008/0030314 A1 * | 2/2008 | Watabe | 340/447 |
| 2008/0055063 A1 * | 3/2008 | Mori | 340/447 |

* cited by examiner

*Primary Examiner* — George Bugg
*Assistant Examiner* — Kerri McNally
(74) *Attorney, Agent, or Firm* — Ralph E. Smith

(57) ABSTRACT

A sensor location identification system may include a plurality of front and rear sensors, a transmitter, and a receiver module. The plurality of front sensors may be connected to a plurality of front tires and may generate first wireless signals indicative of a rotational direction of a corresponding one of said plurality of front tires. The plurality of rear sensors may be connected to a plurality of rear tires and may generate second wireless signals indicative of a rotational direction of a corresponding one of the plurality of rear tires. The transmitter may transmit a location signal received by the plurality of rear sensors. The receiver module may receive the first and second wireless signals and may determine a location of each of the plurality of front and rear tires based on the first and second wireless signals. The second wireless signals may indicate receipt of the location signal.

8 Claims, 3 Drawing Sheets

TIRE PRESSURE SENSOR LOCATION IDENTIFICATION

FIELD

The present disclosure relates to an automotive sensor system and in particular to a tire pressure sensor system.

BACKGROUND

This section provides background information related to the present disclosure which is not necessarily prior art.

Many modern vehicles include tire pressure monitoring systems to alert drivers to a low-pressure condition of one or more of the tires. Such systems typically include a tire-pressure sensor associated with each of the tires or wheels of the vehicle. The tire pressure sensors typically communicate tire-pressure values to a processor or similar device. The system may determine the location of each of the tire pressure sensors to display the location of the corresponding tire having the low-pressure condition. The present disclosure provides a system for identifying the location of each of a plurality of sensors.

SUMMARY

This section provides a general summary of the disclosure, and is not a comprehensive disclosure of its full scope or all of its features.

A sensor location identification system may include a plurality of front and rear sensors, a transmitter, and a receiver module. The plurality of front sensors may be connected to a plurality of front tires and may generate first wireless signals indicative of a rotational direction of a corresponding one of the plurality of front tires. The plurality of rear sensors may be connected to a plurality of rear tires and may generate second wireless signals indicative of a rotational direction of a corresponding one of the plurality of rear tires. The transmitter may transmit a location signal received by the plurality of rear sensors. The receiver module may receive the first and second wireless signals and may determine a location of each of the plurality of front and rear tires based on the first and second wireless signals. The second wireless signals may indicate receipt of the location signal.

In another form, a sensor location identification system may include a plurality of tire pressure sensors, a transmitter, and a receiver module. The plurality of tire pressure sensors may include a front-left sensor, a front-right sensor, a rear-left sensor, and a rear-right sensor. Each of the plurality of tire pressure sensors may be associated with a corresponding one of a plurality of tires and may transmit a data signal. The transmitter may communicate a location signal to the rear-left sensor and the rear-right sensor. The receiver module may receive the data signals and determine a location of each of the plurality of tire pressure sensors based on the data signals. The data signals may include an indication of a rotational direction of each of the plurality of tire pressure sensors and an indication of receipt of the location signal.

A method of determining sensor locations may include providing a plurality of front sensors and a plurality of rear sensors, whereby each of the plurality of front and rear sensors corresponds to each of a plurality of tires. The method may further include determining a rotational direction of each of the plurality of tires, transmitting a location signal, recording receipt of the location signal in the rear sensors, and generating data signals associated with each of the plurality of front and rear sensors indicating the rotational direction of each of the plurality of tires, whereby the data signals associated with the plurality of rear sensors indicate receipt of the location signal. The plurality of data signals may be communicated to a receiver and a location of each of the plurality of front and rear sensors may be determined based on the data signals.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
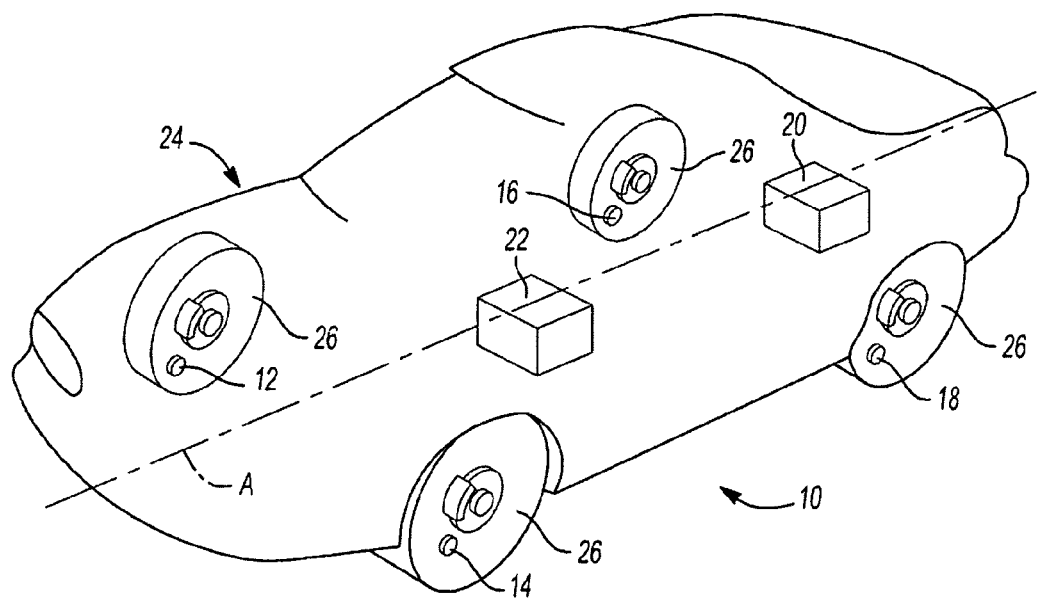
FIG. 1 is a perspective view of a vehicle having a sensor location identification system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 2:
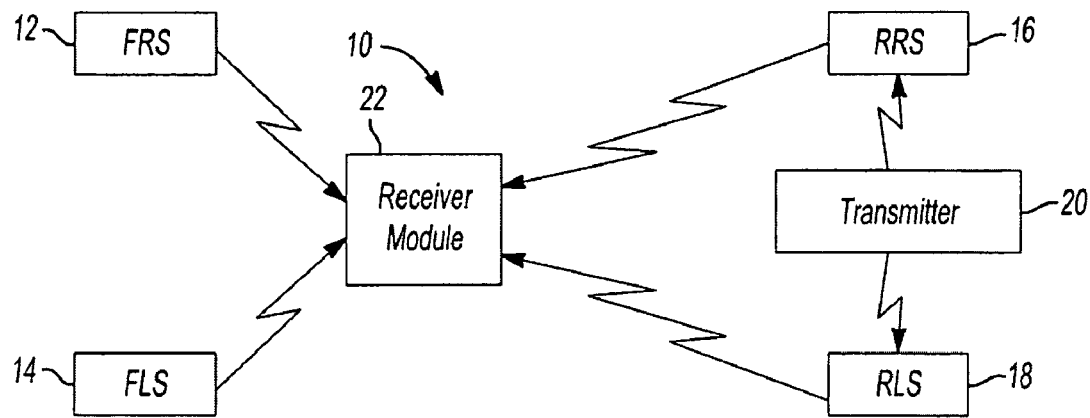
FIG. 2 is a block diagram of the sensor location identification system of FIG. 1.
Figure 3:
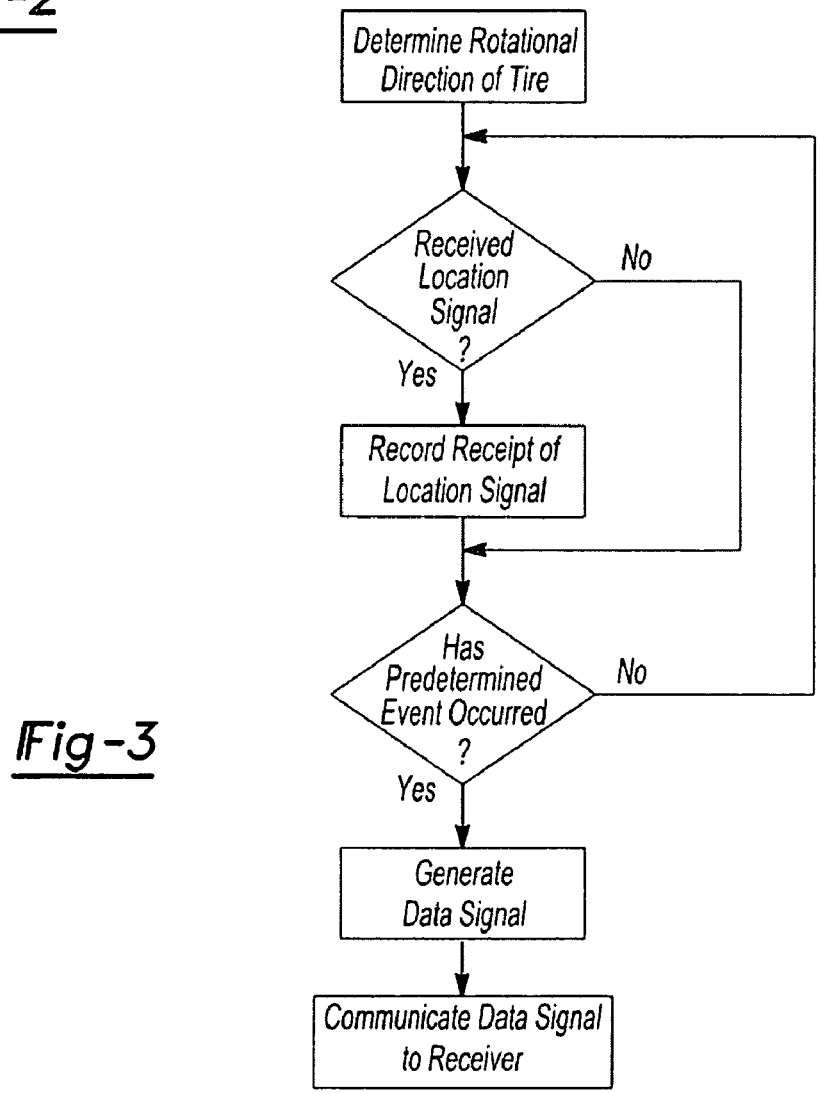
FIG. 3 is a flowchart illustrating operation of a sensor according to the principles of the present disclosure.

With reference to FIGS. 1 and 2, a sensor location identification system 10 is provided. The system 10 may include a front-right sensor (FRS) 12, a front-left sensor (FLS) 14, a rear-right sensor (RRS) 16, a rear-left sensor (RLS) 18, a transmitter 20, and a receiver module 22. The system 10 may be installed in a vehicle 24 having a plurality of tires 26. The receiver module 22 may be in communication with the sensors 12, 14, 16, 18 and may identify and determine the location of each of the sensors 12, 14, 16, 18, as will be subsequently described.

The sensors 12, 14, 16, 18 may be tire pressure monitor sensors and/or any other sensors, and each of the sensors 12, 14, 16, 18 may be attached to or connected directly or indirectly to a corresponding one of the tires 26. An antenna, transmitter, and/or any other suitable device may be integrated with or operatively connected to each of the sensors 12, 14, 16, 18 to receive and transmit a radio frequency (RF) signal or any other type of wireless signal.

The sensors 12, 14, 16, 18 may determine a pressure of a fluid such as, for example, air or nitrogen, within the tires 26. The sensors 12, 14, 16, 18 may include an accelerometer, Hall Effect sensor, and/or any other electric, magnetic, or optical device that determines a relative rotational direction, velocity and/or acceleration of the tires 26. A particular sensor 12, 14, 16, 18 may determine its relative rotational direction to be clockwise or counterclockwise relative to a point of view of the particular sensor 12, 14, 16, 18 looking inward toward an axis. A extending between the front and back of the vehicle 18 (FIG. 1). Accordingly, when the vehicle 18 is moving in a forward direction, the front-left sensor 14 and rear-left sensor 18 may sense a counterclockwise rotational direction relative to the frames of reference described above, and the front-right sensor 12 and rear-right sensor 16 may sense a clockwise rotational direction relative to the frames of reference described above. The term "relative rotational direction," as used herein may refer to clockwise or counterclockwise rotational direction relative to the frames of reference described above.

The transmitter 20 may be in wireless communication with one or more of the sensors 12, 14, 16, 18 and may be located in the front, rear or any other portion of the vehicle 24. The transmitter 20 may receive power and ground inputs connected to standard vehicle wiring. While a battery or other power source of the vehicle 24 is connected to the transmitter 20 and/or when the engine is running or the vehicle 24 is in an accessory mode, the transmitter 20 may continuously or intermittently transmit a location signal. The location signal may be a wireless signal having a frequency of about 125 kilohertz, for example, or any other radio frequency. The location signal may be received by the rear-right sensor 16 and the rear-left sensor 18. Upon receiving the location signal, the rear-right sensor 16 and rear-left sensor 18 may record an indication of receipt of the location signal in an integrated memory device. Such indicia may be stored within the internal memory device and may be subsequently communicated to the receiver module 22.

While the system 10 is described above and shown in the figures as having a single transmitter 20, the system 10 could have two or more transmitters 20. In such an embodiment, one transmitter 20 could be located nearer to one of the rear sensors 16, 18, and another transmitter 20 could be located nearer to the other of the rear sensors 16, 18. Additionally or alternatively, each of the one or more transmitters 20 could have two or more antennas, one of which could be disposed nearer to one of the rear sensors 16, 18 and the other of which could be disposed nearer to the other of the rear sensors 16, 18.

The front-right sensor 12 and front-left sensor 14 may be located farther from the transmitter 20 than the rear-right sensor 16 and rear-left sensor 18. Additionally or alternatively, the front-right sensor 12 and front-left sensor 14 may not be equipped with an antenna or RF receiver. Accordingly, the front-right sensor 12 and front-left sensor 14 may receive fewer or none of the location signals transmitted by the transmitter 20.

The receiver module 22 may be disposed in any suitable location on or in the vehicle 24 and may receive data signals from the sensors 12, 14, 16, 18. The data signals may be RF signals and may include information obtained by the sensors 12, 14, 16, 18 such as any indicia of receipt of the location signal, tire pressure data, and relative rotational direction of the tires 26. The data signal could also include rotational velocity and/or acceleration of the tires 26. The front-right sensor 12 and the front-left sensor 14 may send a first data signal to the receiver module 22 that may lack or include relatively fewer indicia of receipt of the location signal when compared to either rear sensor 16, 18. The rear-right sensor 16 and the rear-left sensor 18 may send a second data signal that may include a relatively greater number of indicia of receipt of the location signal when compared to the front sensors 12, 14, thereby identifying the rear-right sensor 16 and/or the rear-left sensor 18 as being rear sensors.

The receiver module 22 may process the data signals received from each of the sensors 12, 14, 16, 18. As used herein, the term "module" may refer to, be part of, or include an Application Specific Integrated Circuit (ASIC), an electronic circuit, a processor (shared, dedicated or group) and/or memory (shared, dedicated or group) that execute one or more software or firmware programs, a combinational logic circuit and/or other suitable components that provide the described functionality. The receiver module 22 may determine a location of each of the sensors 12, 14, 16, 18 based on the relative rotational direction of each of the tires 26 and whether or how many location signals were received in each of the sensors 12, 14, 16, 18. The receiver module 22 may also communicate the fluid pressure within each of the tires 26 (or an indication of a low tire-pressure condition) to a display module (not shown) disposed within a cab of the vehicle 24.

With reference to FIGS. 1-4, operation of the system 10 will be described in detail. As described above, the sensors 12, 14, 16, 18 may monitor the pressure of the fluid within the tires 26 and determine the relative rotational direction of the tires 26. The receiver module 22 may identify and determine the location of each of the sensors 12, 14, 16, 18 based on the data signal received from the sensors 12, 14, 16, 18.

The transmitter 20 may continuously or intermittently broadcast the location signal when receiving electrical power from the battery or other power source of the vehicle 24. The rear sensors 16, 18 may receive the location signal, and the front sensors 12, 14 may not receive the location signal (or may receive fewer location signals than the rear sensors 16, 18). The sensors 12, 14, 16, 18 may record the indication of receipt of the location signal.

In response to a predetermined event, each of the sensors 12, 14, 16, 18 may generate a data signal and transmit the data signal to the receiver module 22. The predetermined event may be one or more of a determination that one or more of the tires 26 have reached a predetermined rotational velocity, a pressure change within one or more of the tires 26, a change in rotational velocity of one or more of the tires 26, a change in rotational acceleration of one or more of the tires 26, a start-up of the engine of the vehicle 24, and/or the occurrence of any other event or condition.

As described above, the data signal of a particular sensor 12, 14, 16, 18 may include any indicia of receipt of the location signal that has been recorded by the particular sensor 12, 14, 16, 18 and relative rotational direction of the tire 26 corresponding to the particular sensor 12, 14, 16, 18. Based on the data signal received from each of the sensors 12, 14, 16, 18, the receiver module 22 can determine the identity and location of each of the sensors 12, 14, 16, 18.

Figure 4:
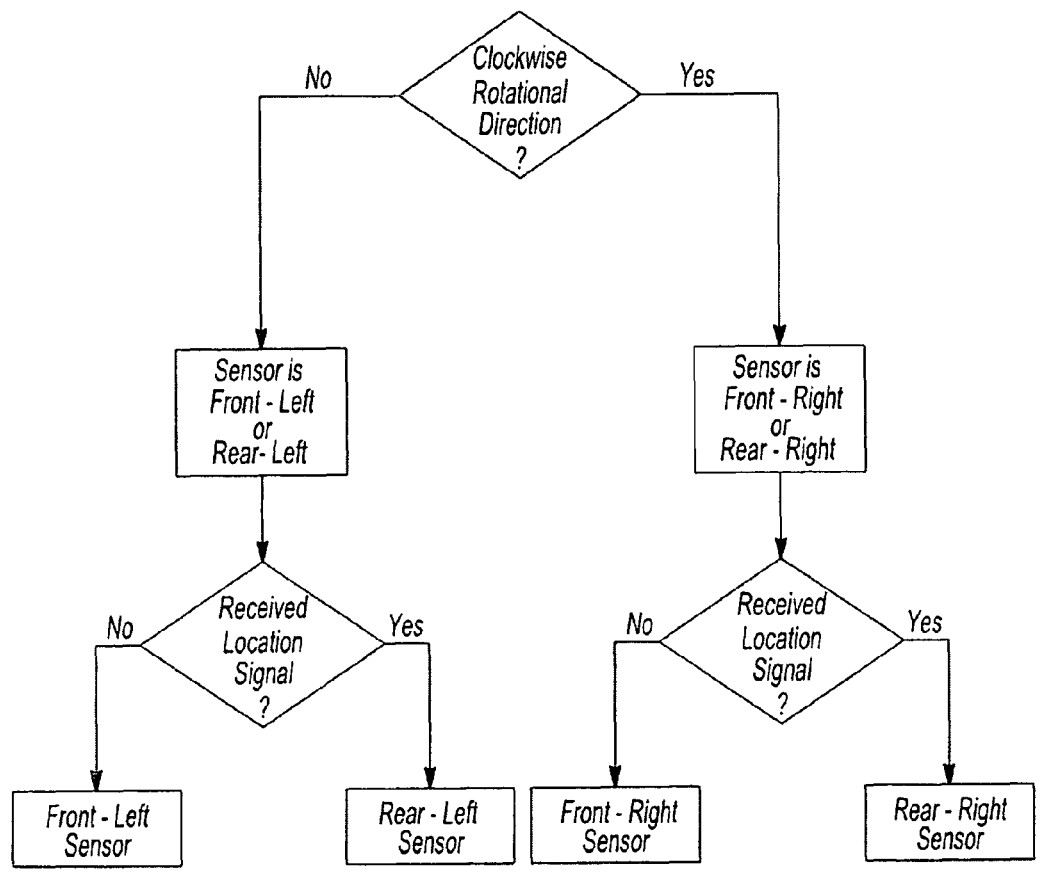
FIG. 4 is a flowchart illustrating a method of determining a location of the sensor according to the principles of the present disclosure.

With particular reference to FIG. 4, a process by which the receiver module 22 determines the identity and location of each of the sensors 12, 14, 16, 18 will be described. Based on the relative rotational direction of the corresponding tire 26 of each of the sensors 12, 14, 16, 18, the receiver module 22 can determine whether a particular sensor 12, 14, 16, 18 is a left-side sensor 14, 18 (i.e., the front-left sensor 14 or the rear-left sensor 18) or a right-side sensor 12, 16 (i.e., the front-right sensor 12 or the rear-right sensor 16). For example, if the relative rotational direction of a particular tire 26 is clockwise, then the corresponding sensor 12, 14, 16, 18 may be one of the right-side sensors 12, 16. If the relative rotational direction of a particular tire 26 is counterclockwise, then the corresponding sensor 12, 14, 16, 18 may be one of the left-side sensors 14, 18.

The receiver module 22 can also determine if a particular sensor 12, 14, 16, 18 is a rear sensor 16, 18 (i.e., the rear-right sensor 16 or the rear-left sensor 18) or a front sensor 12, 14 (i.e., the front-right sensor 12 or the front-left sensor 14). If the data signal received from a particular sensor 12, 14, 16, 18 includes indicia of receipt of the location signal, then the particular sensor 12, 14, 16, 18 may be one of the rear sensors 16, 18. If the data signal received from a particular sensor 12, 14, 16, 18 does not include indicia of receipt of the location signal or relatively less than that received from the other sensors, then the particular sensor 12, 14, 16, 18 may be one of the front sensors 12, 14.

In this manner, the receiver module 22 may determine whether each sensor 12, 14, 16, 18 is a left-side sensor 14, 18 or a right-side sensor 12, 16, and whether each sensor 12, 14, 16, 18 is a front sensor 12, 14 or a rear sensor 16, 18. Accordingly, the receiver module 22 can determine the location and identity of each of the sensors 12, 14, 16, 18. Although FIG. 4 illustrates the receiver module 22 determining whether the relative rotational direction is clockwise before determining whether location signals were received, these steps could be done in any order or simultaneously.

Additionally or alternatively, the receiver module 22 could determine which two sensors 12, 14, 16, 18 received the most location signals. The receiver module 22 could then determine that those two sensors are the rear sensors 16, 18, and the two sensors that received the fewest location signals are the front sensors 12, 14. While the rear sensors 16, 18 are described above as receiving the location signals more frequently than the front sensors 12, 14, the system 10 could be configured such that the front sensors 12, 14 receive the location signals, and the rear sensors 16, 18 receive fewer or none of the location signals. In such a configuration, the transmitter 20 may be located in the front of the vehicle 24 and/or closer to the front sensors 12, 14 than the rear sensors 16, 18.

The relative rotational direction of each of the tires 26 depends on whether the vehicle 24 is moving forward or in reverse. Stated another way, the tires 26 associated with the right-side sensors 12, 16 may rotate in a clockwise direction (relative to the frames of reference described above) while the vehicle 24 is traveling forward and may rotate in a counterclockwise direction (relative to the frames of reference described above) while the vehicle 24 is traveling in reverse. Accordingly, the system 10 could be configured to operate only while the vehicle is traveling forward. Alternatively, the receiver module 22 could be configured to receive information from a vehicle control system indicating whether the transmission of the vehicle is in a forward gear or a reverse gear. It is contemplated that other methods of determining whether the vehicle is traveling forward or in reverse could be incorporated into the system 10. For example, the receiver module 22 could determine that a clockwise relative rotational direction while the vehicle is traveling in reverse indicates that the corresponding sensor is one of the left-side sensors 14, 18. Likewise, the receiver module 22 could determine that a counterclockwise relative rotational direction while the vehicle is traveling in reverse indicates that the corresponding sensor is one of the right-side sensors 12, 16.

Additionally or alternatively, each of the sensors 12, 14, 16, 18 could be configured to determine whether it is a left-side sensor 14, 18 or a right-side sensor 12, 16 based on relative rotational velocity while the vehicle 18 is turning. For example, while the vehicle 18 is moving forward and turning left, the right-side sensors 12, 16 will rotate at a higher velocity than the left-side sensors 14, 18, because the tires 26 on the right-side of the vehicle 18 must turn faster and travel a greater distance than the tires 26 on the left-side of the vehicle 18. Likewise, while the vehicle 18 is moving forward and turning right, the left-side sensors 14, 16 will rotate at a higher velocity and travel a greater distance than the right-side sensors 12, 16. The sensors 12, 14, 16, 18 could communicate with a vehicle control system, such as an input from a steering wheel to determine which direction (i.e., left or right) the vehicle is turning and subsequently determine whether each sensor 12, 14, 16, 18 is a left-side sensor 14, 18 or a right-side sensor 12, 16 based on the relative velocities of the sensors 12, 14, 16, 18 while the vehicle 18 is turning, as described above. It will be appreciated that other methods could be employed to determine whether each sensors 12, 14, 16, 18 is a left-side sensor 14, 18 or a right-side sensor 12, 16.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A system comprising:
   a plurality of first sensors associated with a plurality of first tires, each of said plurality of first sensors adapted to generate first wireless signals indicative of a relative rotational direction of a corresponding one of said plurality of first tires;
   a plurality of second sensors associated with a plurality of second tires, each of said plurality of second sensors adapted to generate second wireless signals indicative of a relative rotational direction of a corresponding one of said plurality of second tires;
   a transmitter adapted to transmit a location signal that is receivable by said plurality of first sensors and said plurality of second sensors, wherein said first wireless signals include indicia of first frequencies at which said plurality of first sensors receive said location signal during a predetermined time period, and wherein said second wireless signals include indicia of second frequencies at which said plurality of second sensors receive said location signal during said predetermined time period; and
   a receiver module receiving said first and second wireless signals and operable to determine a location of each of said plurality of first and second tires based on said first and second wireless signals.

2. The system of claim 1, wherein said plurality of first and second sensors are tire pressure monitoring sensors.

3. The system of claim 1, wherein said plurality of first and second sensors transmit said first and second wireless signals in response to a predetermined event.

4. The system of claim 3, wherein said predetermined event is a change in pressure of at least one of said plurality of first and second tires.

5. The system of claim 3, wherein said predetermined event is an acceleration of at least one of said plurality of first and second tires.

6. The system of claim 1, wherein said transmitter transmits said location signal intermittently.

7. The system of claim 1, wherein said first and second wireless signals indicate tire pressures of said plurality of first and second tires, respectively.

8. The system of claim 1, wherein said plurality of second tires are rear tires of a vehicle.

* * * * *